United States Patent
Shitomi et al.

(10) Patent No.: US 7,284,020 B2
(45) Date of Patent: Oct. 16, 2007

(54) SYSTEM AND METHOD FOR DATA RECOVERY IN A STORAGE SYSTEM

(75) Inventors: Hidehisa Shitomi, Mountain View, CA (US); Yuichi Yagawa, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 162 days.

(21) Appl. No.: 10/930,869

(22) Filed: Sep. 1, 2004

(65) Prior Publication Data

US 2006/0047712 A1 Mar. 2, 2006

(51) Int. Cl.
*G06F 12/00* (2006.01)

(52) U.S. Cl. .......................... 707/202; 707/204; 714/1; 714/2; 714/10; 714/43; 714/48

(58) Field of Classification Search ................ 707/200, 707/202, 204; 711/156, 161, 162; 714/4–6, 714/18, 20, 100, 1, 2, 10, 43, 48
See application file for complete search history.

(56) References Cited

U.S. PATENT DOCUMENTS

| | | | |
|---|---|---|---|
| 5,944,838 A | 8/1999 | Jantz | |
| 6,073,251 A | 6/2000 | Jewett et al. | |
| 6,101,497 A | 8/2000 | Ofek | |
| 6,223,231 B1 | 4/2001 | Mankude | |
| 6,237,008 B1* | 5/2001 | Beal et al. ................... | 707/204 |
| 6,353,878 B1* | 3/2002 | Dunham ...................... | 711/162 |
| 6,529,976 B1 | 3/2003 | Fukuzawa et al. | |
| 6,557,089 B1* | 4/2003 | Reed et al. .................. | 711/162 |
| 6,760,787 B2 | 7/2004 | Forin | |
| 6,766,470 B1 | 7/2004 | Shah | |
| 6,769,071 B1 | 7/2004 | Cheng et al. | |
| 6,912,629 B1* | 6/2005 | West et al. .................. | 711/161 |
| 6,915,315 B2* | 7/2005 | Autrey et al. ............... | 707/204 |
| 6,938,362 B2* | 9/2005 | Saillet et al. ............... | 36/117.3 |
| 7,007,042 B2* | 2/2006 | Lubbers et al. ............. | 707/202 |
| 2001/0047482 A1 | 11/2001 | Harris et al. | |
| 2003/0140210 A1 | 7/2003 | Testardi | |
| 2004/0068561 A1 | 4/2004 | Yamamoto et al. | |
| 2004/0153721 A1 | 8/2004 | Fujimoto | |
| 2004/0260736 A1* | 12/2004 | Kern et al. .................. | 707/204 |
| 2005/0071708 A1* | 3/2005 | Bartfai et al. ................... | 714/5 |

FOREIGN PATENT DOCUMENTS

JP    A 2002-182862    1/2004

OTHER PUBLICATIONS

EMC Powerpath, Enterprise Storage software, Product Description Guide., EMC Corporation,□□1999.*
EMC Powerpath, Enterprise Storage Software, Product Description Guide., EMC Corporation, 1999.*
EMC PowerPath, Enterprise Storage Software, Product Description Guide., EMC Corporation, 2002, 2004.

* cited by examiner

*Primary Examiner*—John Cottingham
*Assistant Examiner*—Robert M Timblin
(74) *Attorney, Agent, or Firm*—Mattingly, Stanger, Malur & Brundidge, P.C.

(57) ABSTRACT

A system and method for automatic failure recovery in a storage system that includes replicating data stored in a first storage volume at a storage system into a second storage volume at the storage system, the first storage volume handling Input/Output (I/O) operations between the storage system and a host device. A failure is detected in the I/O operations with the first storage volume and a recovery process initiated that includes identifying a path from the host device to the second storage volume or a third storage volume to allow continuation of the I/O operations automatically. The third storage volume containing data recovered from the second storage volume.

35 Claims, 16 Drawing Sheets

FIG. 2

Volume Management Table

| Volume Name | WWN | LUN | used | Prim/Scnd | Pair | Rcvry | Access | etc. |
|---|---|---|---|---|---|---|---|---|
| A | WWN1 | 01 | Y | P | B | E | H | |
| B | WWN2 | 01 | Y | S | A | - | L | |
| C | WWN1 | 02 | Y | P | D | F | H | |
| D | WWN2 | 02 | Y | P | C | - | L | |
| E | WWN3 | 01 | N | - | - | G | H | |
| F | WWN5 | 01 | N | - | - | H | L | |

FIG. 4

Path Management Table

| Volume Name | Path (I/F) | Main/Backup /Corrupt | Recovery volume |
|---|---|---|---|
| A | 110 | C | E |
| B | 111 | B | - |
| C | 110 | M | - |
| D | 111 | B | - |
| E | 112 | M | - |
| F | 114 | M | - |

SYSTEM AND METHOD FOR DATA RECOVERY IN A STORAGE SYSTEM

BACKGROUND

1. Field of the Invention

This invention relates to storage systems, and more specifically to data recovery storage systems that improve the data access speed after a failure occurs by automatically recovering a volume from a replicated volume and switching a data access path to the new volume.

2. Description of the Related Art

Storage area networks (SAN) provide a solution for storing and retrieving mass amounts of data. A typical SAN architecture may include one or more host devices interconnected to one or more network devices or switches through an interface. The network devices or switches may then be interconnected to one or more data storage devices through a second network or interface. Many SAN architectures use Fibre Channel (FC) as the interface or network, however, Ethernet, Infiniband, Internet, and other networks/interfaces may also be used in a SAN architecture.

Since the amount of important data stored in storage systems is always increasing, the storage systems have to be more reliable. However, even if new technologies are developed for better reliability, the failure of storage systems is still possible. Even worse, currently the possibilities of disasters are rising. To protect data stored in storage systems, the backup and recovery mechanisms become important. Further, the high availability parts of storage systems are crucial in order to keep the storage systems available even if a failure occurs.

A local replication mechanism usually uses a local volume as a replication target. In order to reduce the risk of disaster or failure and to reduce the cost of hardware, using a cheap or residual remote volume as a target volume is a possible solution. However, when a failure occurs and the replicated volume has to be accessed from a host, the data access speed of the replicated volume is slower than that of local volume.

Moreover, a path switch mechanism changes a data access path to a backup path if a failure of a main path is detected. Even if it works with the local replication mechanism stated above, a recovery of the replicated data is out of scope. After finishing a path switch, a recovery of data is needed in order to keep the data backup available. In current systems, the recovery process has to be manually done by users or administrators of storage systems.

Therefore, there is a need for data recovery storage systems that recover automatically and with improved data access speed after a failure occurs.

SUMMARY OF THE INVENTION

A system and method for automatic failure recovery in a storage system that includes replicating data stored in a first storage volume at a storage system into a second storage volume at the storage system, the first storage volume handling Input/Output (I/O) operations between the storage system and a host device. A failure is detected in the I/O operations with the first storage volume and a recovery process initiated that includes identifying a path from the host device to the second storage volume or a third storage volume to allow continuation of the I/O operations automatically. The third storage volume containing data restored from the second storage volume.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein:

FIG. 2 is a diagram of a volume management table according to an example embodiment of the present invention;

FIG. 4 is a diagram of a path management table according to an example embodiment of the present invention;

DETAILED DESCRIPTION

Figure 1:
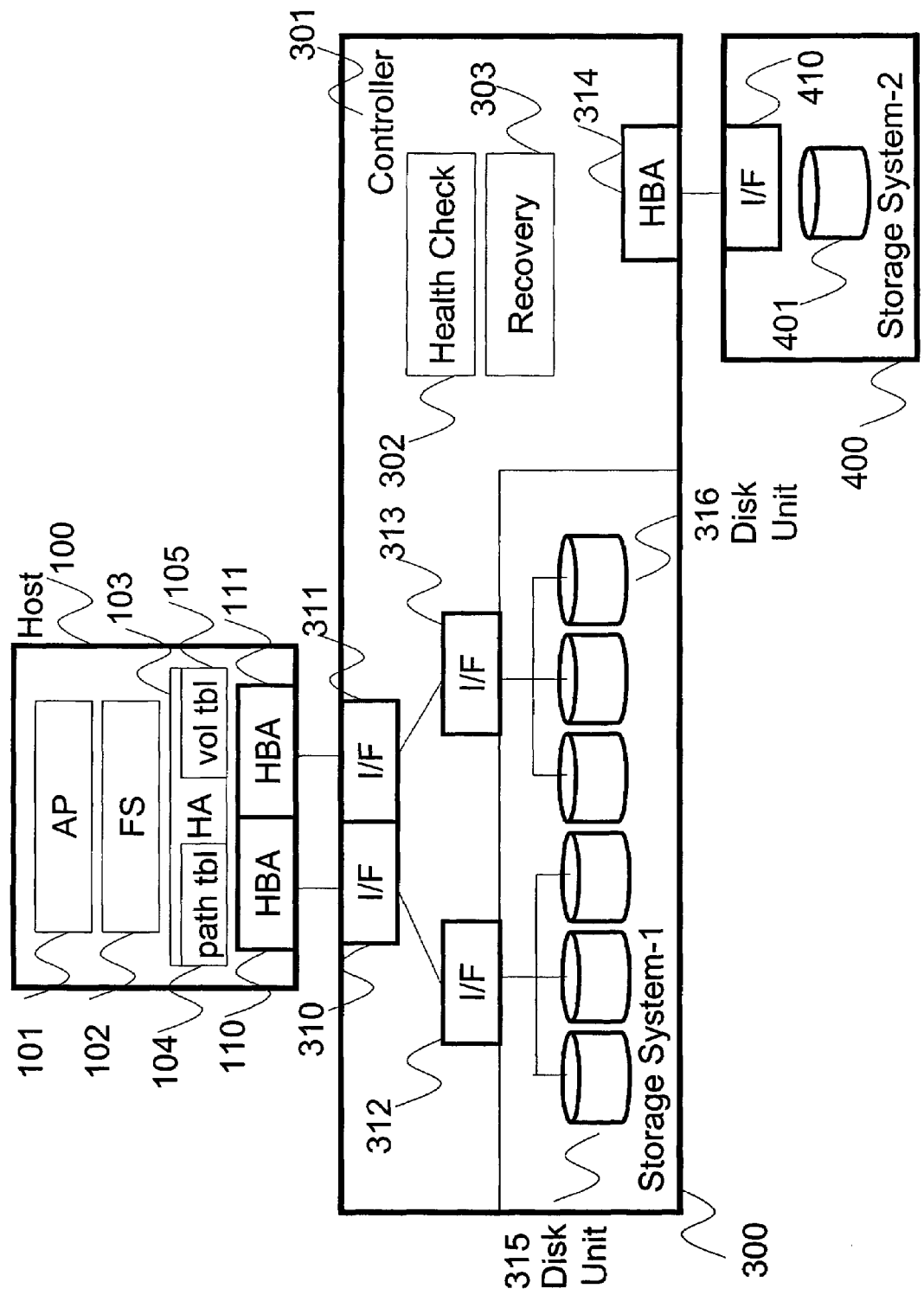
FIG. 1 is a diagram of a data recovery storage system according to an example embodiment of the present invention.

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Embodiments of the present invention relate to improving the data access speed after a failure occurs, making systems possible to automatically recover a volume from a replicated volume, and switching a data access path to the new volume. According to embodiments of the present invention, a system automatically detects a failure and recovers a volume from a replicated volume, which may be located in a remote storage system. The recovery volume may be located in the local storage system. The system changes a data access path to the new volume allowing the volume to be accessed at almost the same speed even after a failure, while the data replication mechanism continues to operate.

In an embodiment of the present invention, a local replication mechanism may be used for the data backup. When a host writes data to a volume, which may also be called a primary volume, the storage system automatically copies the data to a replication volume, which may also be called a secondary volume. A path switch mechanism may be used for the high availability (HA) systems. Users or administrators may define multiple paths to a storage system at the path switch mechanism. When a failure occurs, the mechanism switches a path to a backup path. Therefore, systems according to the present invention that have these two mechanisms are highly available and reliable.

FIG. 1 shows a diagram of a data recovery storage system according to an example embodiment of the present invention. The system may include a host device 100, a storage system 300, and a remote storage system 400. The host device 100 may include an application system (AP) 101, a file system (FS) 102, and a High Availability module (HA) 103, and a path management table 104 and volume management table 105 that are both used by the HA module 103. The high availability module may be a software module, or implemented in hardware, or a combination of hardware and software. The Host 100 may be connected to the storage system 300 via one or more host bus adapters (HBA) 110, 111. One HBA connection such as a first HBA 110 may be a main path for input/output (I/O) operations. A second HBA connection 111 may be a backup path. There may also be more HBA connections to the storage system 300.

The application system 101 issues I/O operations to the storage system 300. These operations from the application system 101 may not pass through the file system 102. The HA module 103 may select a path to the storage system 300. The storage system 300 may include a disk controller 301 and one or more disk units 315, 316. Each disk unit may be connected to a disk controller 301 via a storage interface (I/F) 312, 313. A remote storage system 400 may be connected to the disk controller 301 via an HBA 314. One or more interfaces 310, 311 may be used for connecting the disk controller 301 with the host device 100.

The disk controller 301 may include a health check module 302 and a recovery module 303. The health check module 302 and the recovery module 303 may each be implemented in hardware, software, or a combination of hardware and software. The health check module 302 performs a failure detection function such as, for example, checking the volumes in the disk units 315, 316 to determine whether they work well or not. If the health check module 302 detects a failure on a volume, it may invoke the HA module 103. The recovery module 303 may handle the recovery of data on the failed volume by using replicated data. A remote storage system 400 may be connected to the storage system 300 via an interface 410. In this embodiment of the present invention, the usage of a remote storage system 400 may be used, however, as will be discussed later, in other embodiments of the present invention a remote storage system may not be used.

FIG. 2 shows a diagram of a volume management table according to an example embodiment of the present invention. This table maintains volume allocation information and possibly other information associated with a volume such as, for example, volume name, a world wide node (WWN), logical unit number (LUN), whether the volume is used or is un-used, whether the volume is a primary volume or a secondary volume, another volume that may be paired with this volume, a recovery volume used when this volume fails, or an access frequency (e.g., high (H) or low (L)) of the disk units to which a volume belongs, etc. This table may reside at a host device, for example, in a high availability module at the host device.

Figure 3:
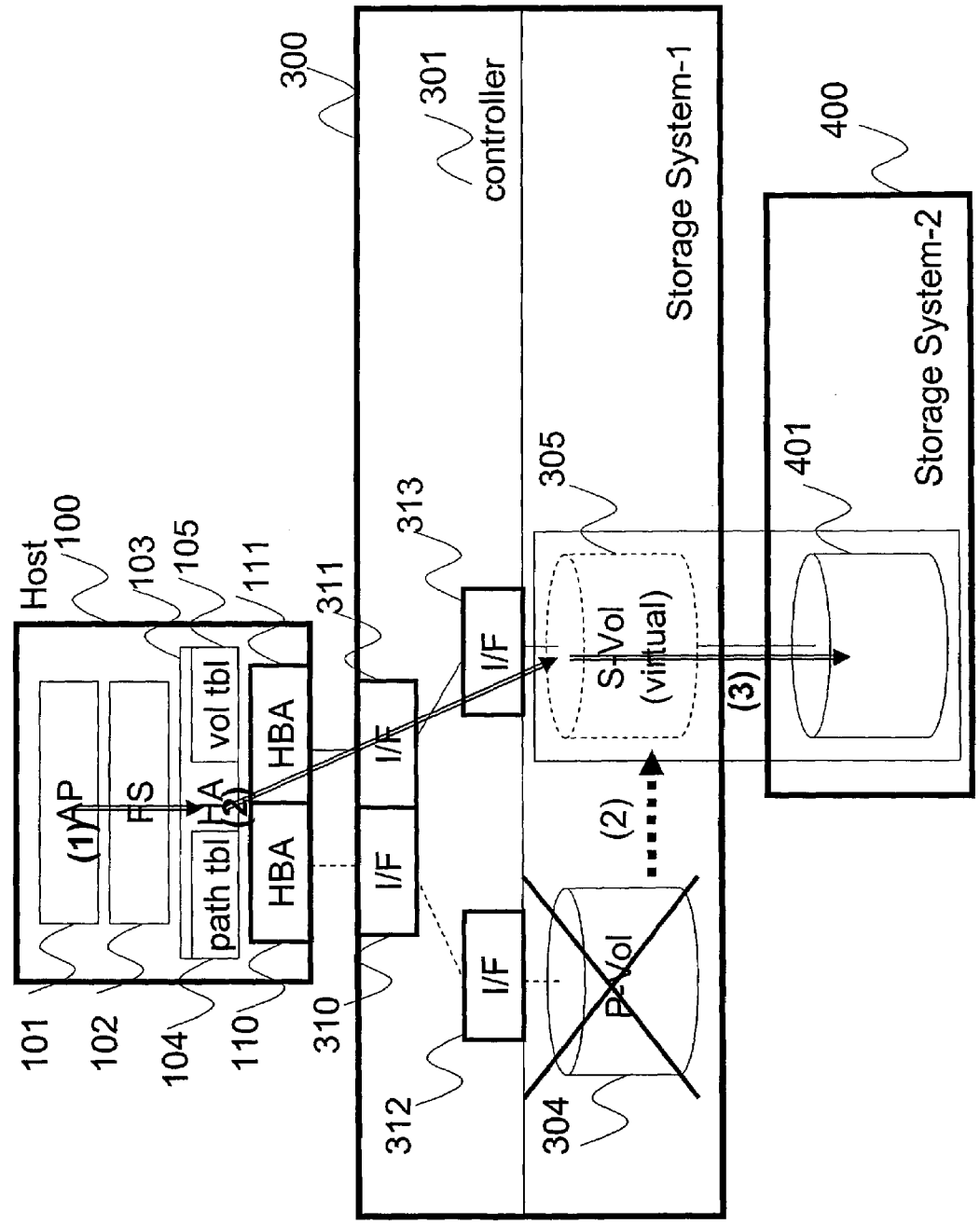
FIG. 3 is a diagram of a data recovery storage system without health check and recovery modules according to an example embodiment of the present invention.

FIG. 3 shows a diagram of a recovery process of the data recovery storage system without health check and recovery modules according to an example embodiment of the present invention. In this example embodiment, a HA module may perform a failure detection function. The system may include a host device 100, a storage system 300, and a remote storage system 400. The host device 100 may include an application system (AP) 101, a file system (FS) 102, and a High Availability module (HA) 103, and both a path management table 104 and a volume management table 105 that are used by the HA module 103. An application system 101 generates I/O operations (1). If the HA module 103 detects some failure on the route to a physical primary volume (P-VOL) 304, a secondary volume (S-VOL) 305 in a volume management table 105 may be selected, for example a secondary volume B for a primary volume A, and a backup path in a path management table 104 may be selected (2), for example, a backup path using a second HBA 111 and interface 311. The path table 104 may contain information on the architecture of the data recovery storage system including all possible paths and interfaces from the host device 100 to volumes on the storage system 300 and other storage systems. The path table 104 may also identify which volumes are being used as the main path and which are being used as backup. Furthermore, the volume management table and the path management table can be integrated into one management table.

Upon detection of a failure, a virtual secondary volume (S-VOL) 305 may be detached from the P-VOL 304 by the storage system 300, and the virtual secondary volume (S-VOL) 305 may be accessed directly by the Host 100. Because the S-VOL 305 may be a virtual volume, the operations from the host device may pass to a remote physical volume 401 (3). The application system 101 need not know about the path switch, thus, the path switch may occur transparent to the application system 101.

FIG. 4 shows a diagram of a path management table according to an example embodiment of the present invention. This table may include path information related to a data recovery system. The path information may include, for example, a volume name, a path interface, a path type such as whether the path is a main path, a backup path, or whether the path is corrupt and not usable, or an assigned recovery volume. This information may be used by a HA module.

Figure 5:
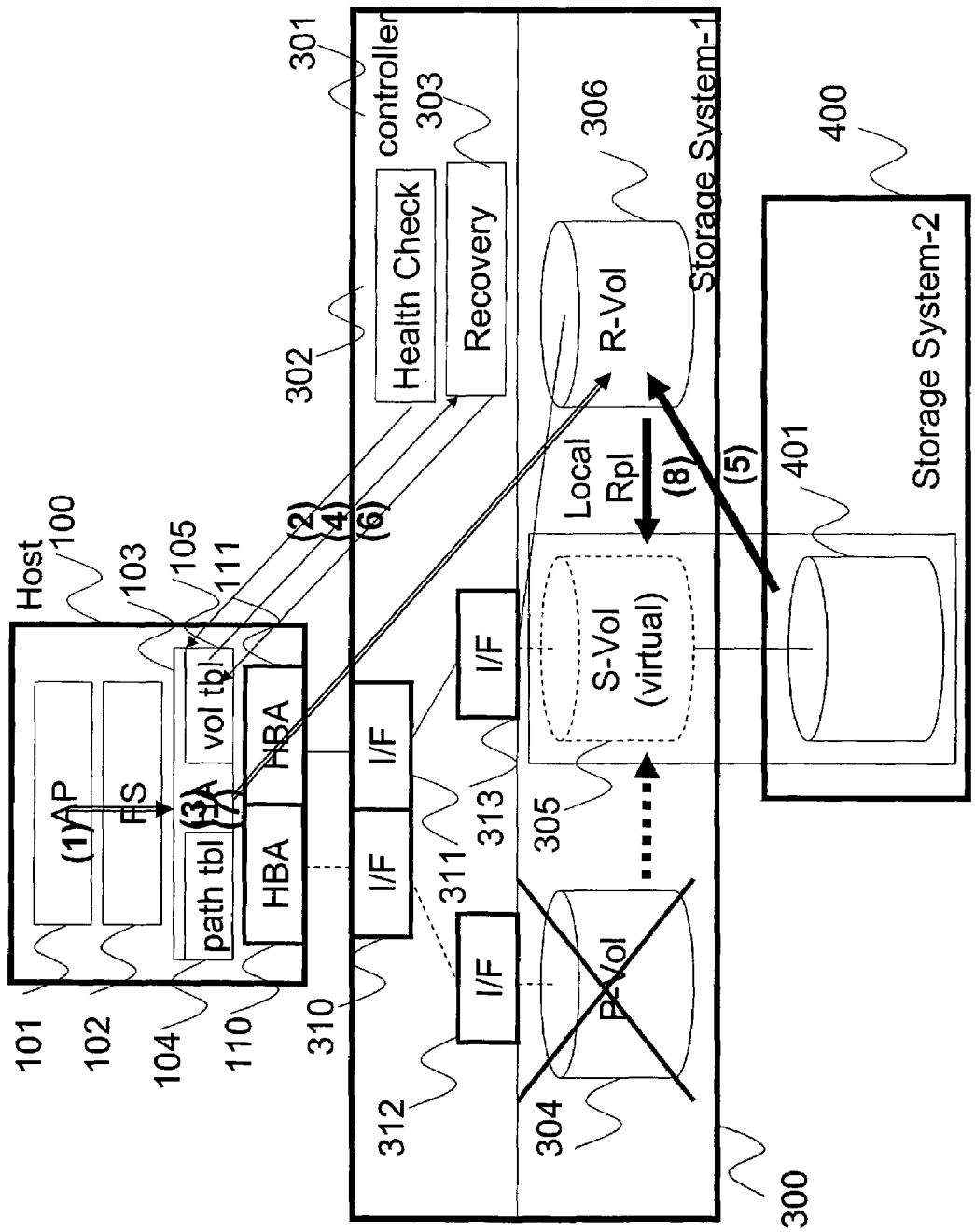
FIG. 5 is a diagram of a data recovery storage system containing a local physical recovery volume according to another example embodiment of the present invention.

FIG. 5 shows a diagram of a data recovery storage system containing a local recovery physical volume according to an example embodiment of the present invention. The system may include a host device 100, a storage system 300, and a remote storage system 400. The host device 100 may include an application system (AP) 101, a file system (FS) 102, and a High Availability module (HA) 103, and a path management table 104 and volume management table 105 that are both used by the HA module 103. A single solid line represents a control flow. A double solid line represents a data access path. A single bold line represents a data movement. A dotted bold line represents the end of data movement. The same general rule of representation is used in the subsequent figures.

The storage system 300 may include a disk controller 301 and one or more disk units. Each disk unit may be connected to a disk controller 301 via a storage interface (I/F) 312, 313. One or more interfaces 310, 311 may be used for connecting the disk controller 301 with the host device 100.

The disk controller 301 may include a health check module 302 and a recovery module 303. An external remote storage system 400 may contain a physical volume 401 that is mapped to the S-VOL 305. The disk unit with the S-VOL 305 and an interface 313 to the controller 301 may also include a recovery volume 306.

The application system 101 generates I/O operations (1). If the health check module 302 detects some failure on the P-VOL 304, it may notify the HA module 103 of the failure (2). The HA module 103 may also detect a failure. The health check module 302 may also detect disk failures. The HA module 103 may detect both link failures and disk failures. The HA module 103 may not be able to determine which of these failures is the real failure if both are detected. After receiving a notification of failure from the health check module 302, a HA module 103 may stop accessing the P-VOL 304 until a recovery process finishes (3). Moreover, a HA module 103 may not stop and may tentatively access a S-VOL 305. The HA module 103 may change a path to a secondary volume using information contained in a volume management table 105 and a path table 104. The path table 104 may contain information on the architecture of the data recovery storage system including all possible paths and interfaces from the host device 100 to volumes on the storage system 300.

Further, a HA module 103 may invoke a recovery module 303 that contains addresses of the S-VOL 305 and a recovery volume (R-VOL) 306 (4). The R-VOL may be pre-determined by users, and managed by a volume management table 105. For example, referring to FIG. 2, the recovery volume for the volume A is the volume E. The recovery module 303 may recover a volume from a replicated volume 401 to a pre-determined volume R-VOL 306 (5). In addition, the S-VOL 305 may be detached from the P-VOL 304 and attached to the R-VOL 306, consequently detaching the replicated volume 401 also from the P-VOL 304 and attaching it to the R-VOL 306. The replicated volume 401 may be copied either directly to the R-VOL 306 or through the S-VOL 305. The R-VOL 306 may be selected dynamically, and not pre-determined. A dynamic selection may occur using information such as volume access frequency in a volume management table 105 at the HA module 103. An example of this embodiment will be discussed later. The recovery module 303 may notify the completion of recovery to the HA module 103 (6). The HA module 103 may redirect I/O operations to the R-VOL 306, where the path to the R-VOL 306 may be selected from the path management table 104 (7). For example, referring to FIG. 4, the recovery volume E has an associated path interface 112. The HA module 103 updates information in the path table 104. Again referring to FIG. 4, for example, the Main/Backup/Corrupt column of Volume A may be updated from M (Main) to become C, which means Corrupt, and the Recovery volume column of Volume A may be updated to become E. The written data in the R-VOL 306 may be recovered to the S-VOL 305 (8).

This embodiment of the present invention is advantageous in that the data access speed is fast, since the R-VOL 306 is located at the local storage system, and not at a remote storage system. Moreover, the recovery process is automatically performed by the recovery module 303 upon detection of a failure, and not done by users or administrators. Further, the replication process continues to operate after detection of a failure.

Figure 6:
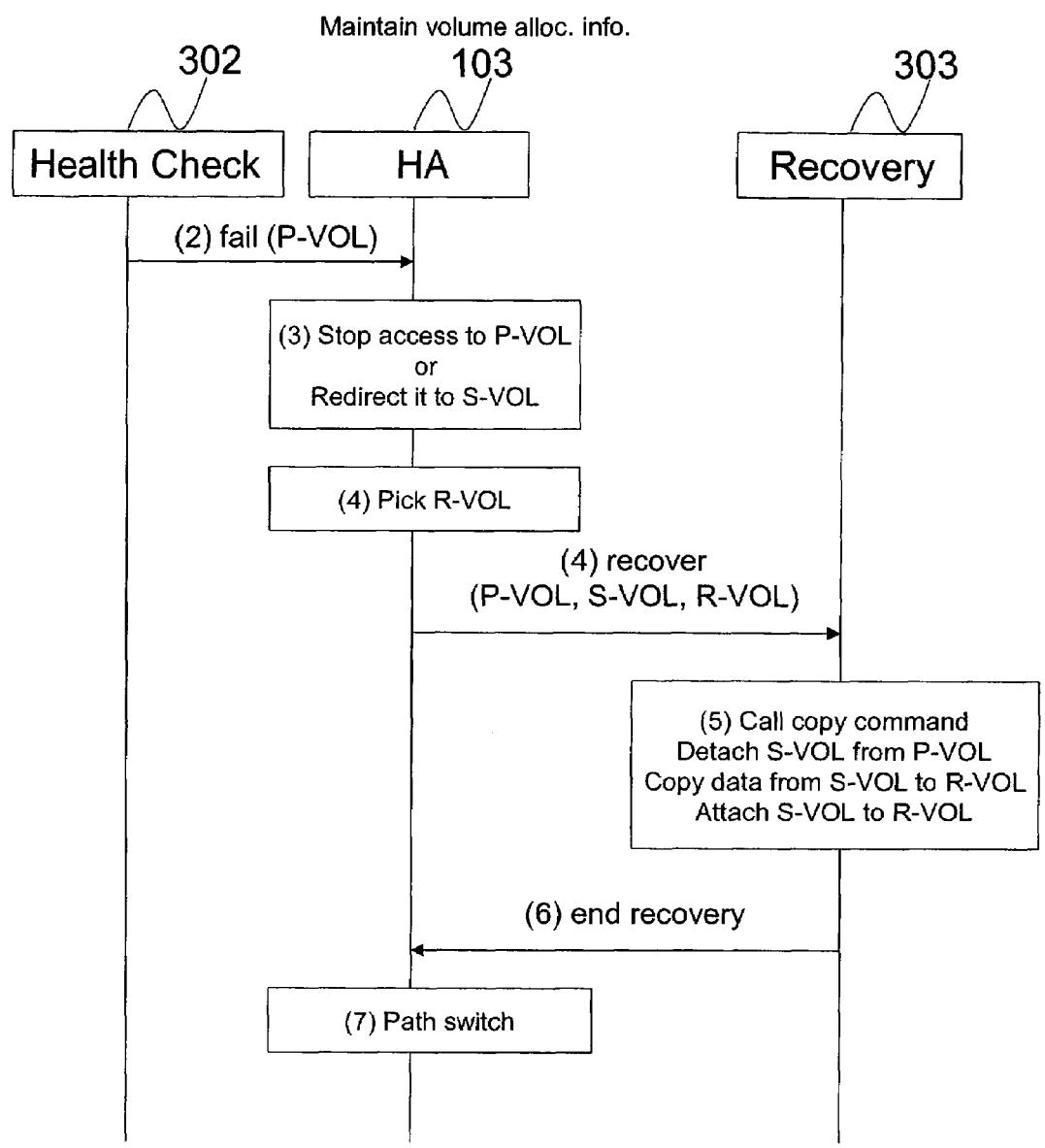
FIG. 6 is a sequence diagram of data recovery operation according to the example embodiment of FIG. 5.

FIG. 6 shows a sequence diagram of data recovery operation according to the example embodiment of FIG. 5. A health check module 302 detects a failure in the storage system and notifies a HA module 103 of the failure (2). The HA module 103 maintains volume allocation information in a volume management table 105. The volume management table 105 may include information regarding which volumes are primary volumes 304, secondary volumes 305 and recovery volumes 306. After receiving notification of a failure, the HA module 103 may stop accessing the primary volume 304 until a recovery process has completed, or may redirect the accesses to a secondary volume 305 during the recovery process (3).

The HA module 103 may send information regarding which volumes are primary volumes 304, secondary volumes 305 and recovery volumes 306 to a recovery module 303 (4). The recovery module 303 may call the existing copy/migration command in the disk controller 301, and then copy data from the secondary volume 305, or the remote volume 401, into the recovery volume 306 as part of the recovery process (5). Further, as part of the recovery process, the S-VOL 305 may be detached from the P-VOL 304, consequently, therefore, detaching the remote volume 401 from the P-VOL 304. The S-VOL 305 may then be attached to the R-VOL 306. The recovery module 303 may then notify the HA module 103 of completion of the recovery process (6), and the HA module 103 may then switch the access path to the recovery volume 306 (7). After finishing the recovery process, data may be replicated from the recovery volume 306 to the secondary volume 305. Therefore, the recovery volume may be accessed faster while the replication mechanism still works.

Figure 7:
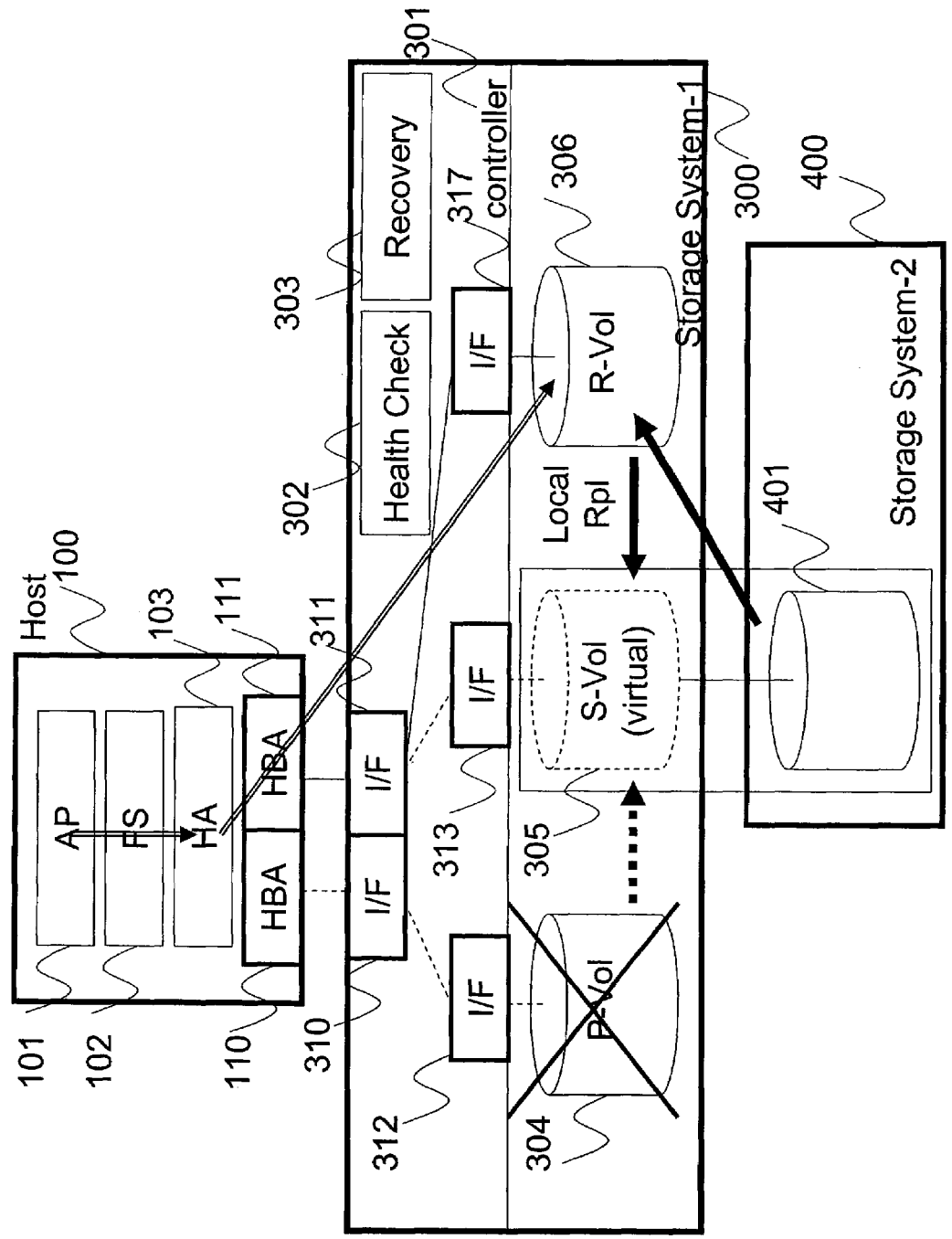
FIG. 7 is a diagram of a data recovery storage system with a secondary volume and a local recovery volume residing on different disk units according to an example embodiment of the present invention.

FIG. 7 shows a diagram of a data recovery storage system with a secondary volume and a local recovery volume residing on different disk units according to an example embodiment of the present invention. This example embodiment is similar to the system embodiment shown in FIG. 5, except in FIG. 5 the R-VOL 306 was selected from the same disk unit as the S-VOL 305. However, in this embodiment, a storage system 300 contains a S-VOL 305 and a R-VOL 306 on different disk units and, therefore, another storage interface 317 exists. The interface 317 provides the controller 301 access to disk unit containing the recovery volume 306. The storage interface 317 may be connected with another interface 311 or one or more other interfaces to the Host 100. In this embodiment, even if the link between the interface 311 and 313 is disconnected, the R-VOL 306 can be accessed by the connection between interface 311 and the interface 317.

The types of failures that may be detected in storage systems according to embodiments of the present invention may include, for example, failure of an HBA on a Host, failure of a link between an HBA on a Host and an interface on a storage system, failure of an interface on a storage system, failure of a link between an interface to a Host and a storage interface on a storage system, failure of a storage interface, failure of a link between a storage interface and a volume, and failure of a disk. Although the embodiments of the present invention have been illustrated using a failed primary volume, the present invention is not limited to this and thus, embodiments of the present invention may be applied to any of the above failures or any other type failures.

Figure 8:
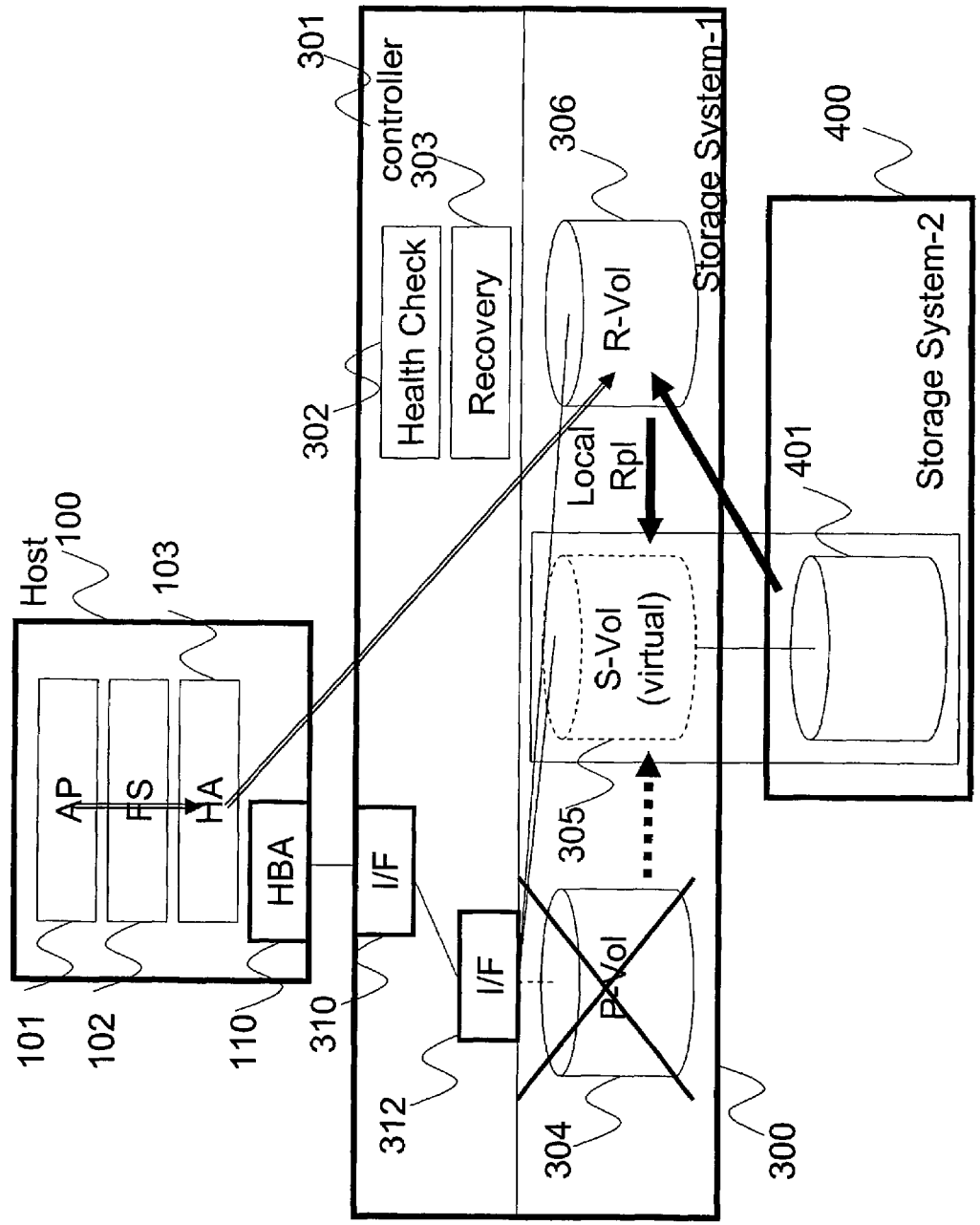
FIG. 8 is a diagram of a data recovery storage system with primary, secondary and recovery volumes residing on the same disk unit according to an example embodiment of the present invention.

FIG. 8 shows a diagram of a data recovery storage system with primary, secondary and recovery volumes residing on the same disk unit according to an example embodiment of the present invention. This example embodiment is similar to the system embodiment shown in FIG. 5, except in the embodiment in FIG. 8, a storage system 300 includes a primary volume 304, a secondary volume 305, and a recovery volume 306 all residing on the same disk unit. A controller 301 contains an interface 312 to the disk unit allowing the controller 301 access to the primary volume 304, the secondary volume 305, and the recovery volume 306. This embodiment of the present invention may show that volumes are not necessarily picked from different disks. In most failures, the path may need to be changed. However, in the case of a disk failure, if there is just one disk failure, a single parity may allow recovery from the failure. Even if more than one disk fails, when the written data has a single parity, the R-VOL 306 can be on the same disk unit as the P-VOL 304 and S-VOL 305. As shown in FIG. 8, in this example embodiment, the P-VOL 304, S-VOL 305 and R-VOL 306 can be on the same disk unit and provide access from the host device 100 through a common set of interfaces 312, 310.

Figure 9:
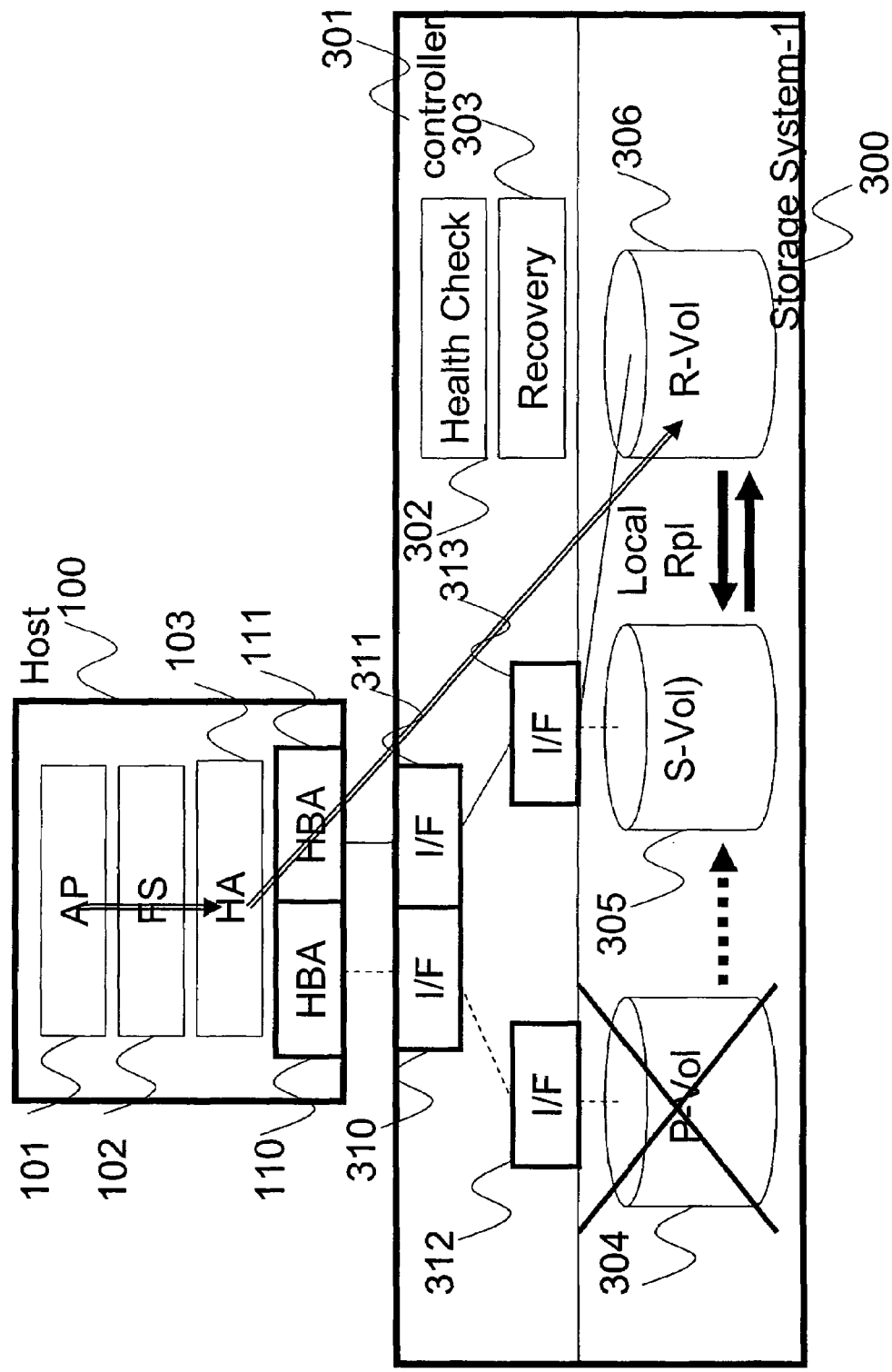
FIG. 9 is a diagram of a data recovery storage system where the secondary volume is a physical volume, according to an example embodiment of the present invention.

FIG. 9 shows a diagram of a data recovery storage system where the secondary volume is a physical volume, according to an example embodiment of the present invention. In previous example embodiments, a remote storage system 400 existed containing the real data of a virtual secondary volume in the storage system 300. In the embodiment of the present invention shown in FIG. 9, the storage system 300 includes a S-VOL 305 that is a real physical volume, not a virtual volume. The recovery process may be the same as that in the embodiment of FIG. 5 except that the recovery data comes from a local volume, the S-VOL 305, and is recovered to a recovery volume 306. A controller 301 includes a health check module 302, a recovery module 303. The health check module 302, a recovery module 303 and the HA module 103 with both a path management table and a volume management table (not shown), provide for automatic recovery and path switching upon detection of a fault.

Figure 10:
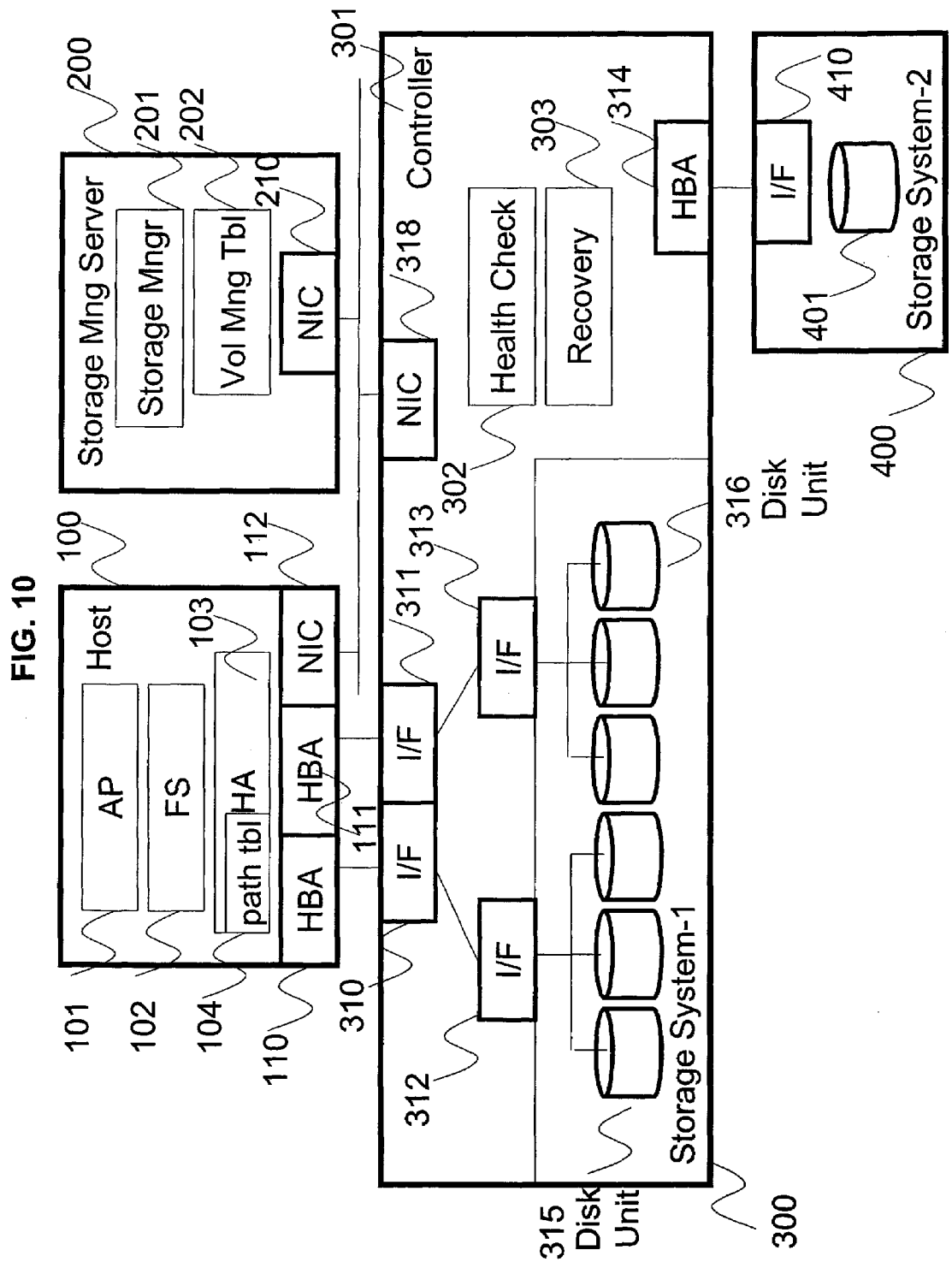
FIG. 10 is a diagram of a data recovery storage system with a storage management server, according to an example embodiment of the present invention.

FIG. 10 shows a diagram of a data recovery storage system with a storage management server, according to an example embodiment of the present invention. This embodiment of the present invention is similar to the embodiment shown in FIG. 1, except the embodiment show in FIG. 10 includes a storage management server 200. Storage management server 200 may include a storage manager 201, and a volume management table 202. The volume management table 202 may contain the same information as the volume management table 105, illustrated in other embodiments, that resides in the high availability module 103 at host device 100. In an embodiment of the present invention shown in FIG. 10, a HA module 103 may not have a volume management table. The storage management server 200 may be connected with a host device 100 and the storage system 300 via a network interface card (NIC) 210. A health check module 302 may detect storage system failures. The HA module 103 may or may not detect failures. The storage manager 201 monitors the disk utilization and other information on the storage system 300. Moreover, storage manager 201 selects an appropriate volume for a recovery volume dynamically, and commands the storage system 300 to initiate a recovery process. The storage manager 201 may also provide the location of the recovery volume to the HA module 103 in order for the HA module 103 to switch the operation path using a path table 104. The path management table 104 may contain information on the architecture of the data recovery storage system including all possible paths and interfaces from the host device 100 to storage volumes at the storage system 300. The volume management table 202 may contain the disk utilization for all volumes and other information.

Figure 11:
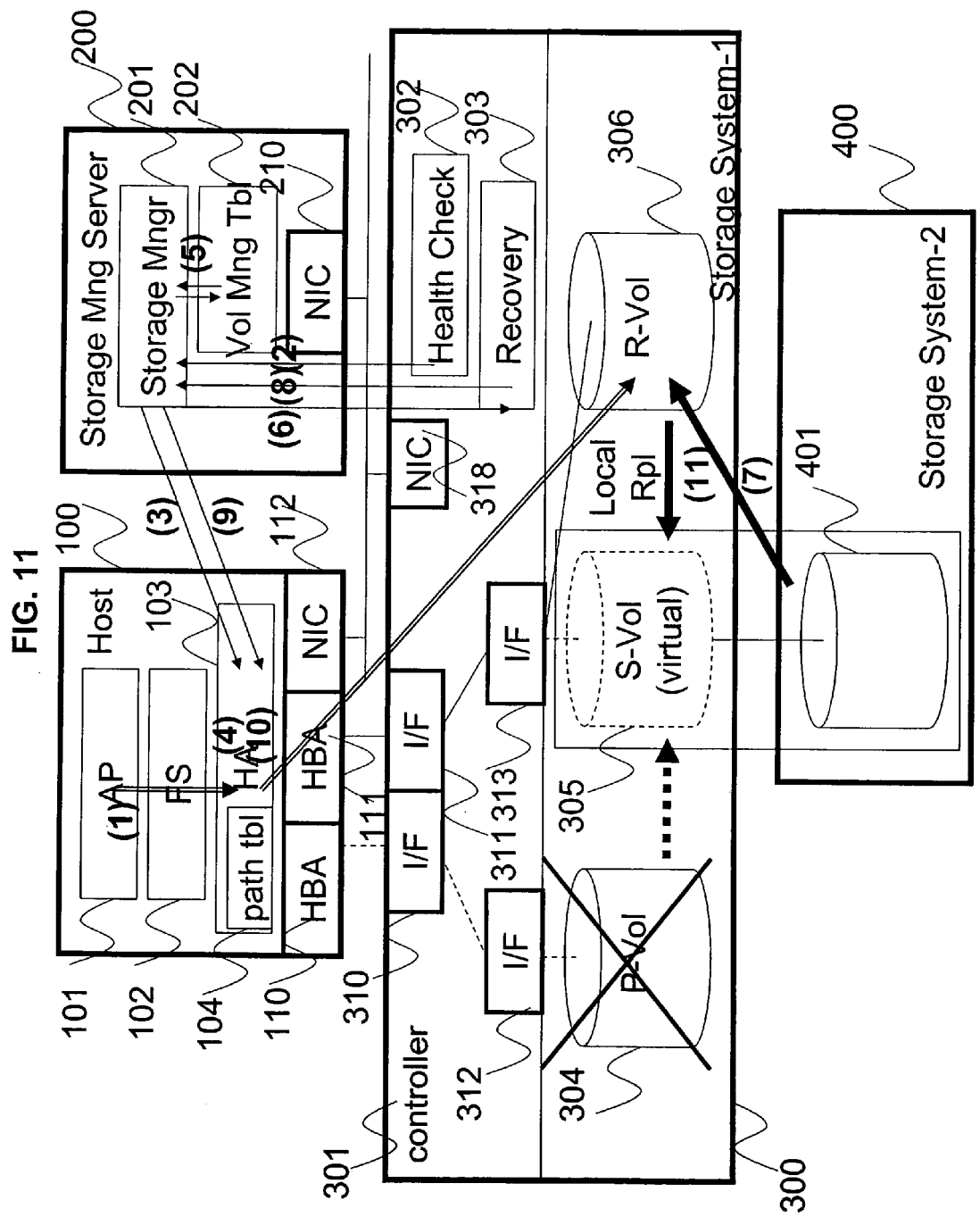
FIG. 11 is a diagram of a recovery process on the data recovery storage system with a storage management server, according to an example embodiment of the present invention.

FIG. 11 shows a diagram of data recovery storage system with a storage management server illustrating a recovery process, according to an example embodiment of the present invention. The application system 101 generates I/O operations (1). When the health check module 302 of the controller 301 at the storage system 300 detects some failure on the P-VOL 304, it may notify a storage manager 201 at a storage management server 200 (2). The storage manager 201 may inform the HA module 103 of the failure and provide addresses of a P-VOL 304 and a S-VOL 305 by searching in a volume management table 202 (3). After getting the notification of failure from the storage management module 201, the HA module 103 may stop accessing the P-VOL 304 until a recovery process finishes (4). Alternatively, the HA module 103 may not stop the accesses and may tentatively continue accesses to the S-VOL 305, and after completion of a recovery process, the HA module 103 may change the path to a recovery volume.

The storage manager 201 may select a volume for the R-VOL 306 based on the information stored in a volume management table 202 (5), which may contain a number of volume selection algorithms. One of the algorithms may be to pick out a volume in a disk unit that is the least busy. The information stored in the management table may depend on the volume selection algorithm. The storage manager 201 may command initiation of a data recovery from the remote storage system 400 to the recovery module 303 (6). The recovery module 303 may recover the volume from a replicated volume 401 to the R-VOL 306 (7). Moreover, the S-VOL 305 may be detached from the P-VOL 304 and attached to the R-VOL 306 (consequently detaching the replicated volume 401 also from the P-VOL 304 and attaching it to the R-VOL 306). The replicated volume 401 may be copied either directly to the R-VOL 306 or through the S-VOL 305. The recovery module 303 notifies the completion of the recovery process to the storage manager 201 (8). The storage manager 201 may then notify the completion of recovery to the HA module 103 with the address of the R-VOL 306 (9). The HA module 103 may then redirect I/O operations to the R-VOL 306 (10). The data written in the R-VOL 306 may be replicated to the S-VOL 305 (11).

Figure 12:
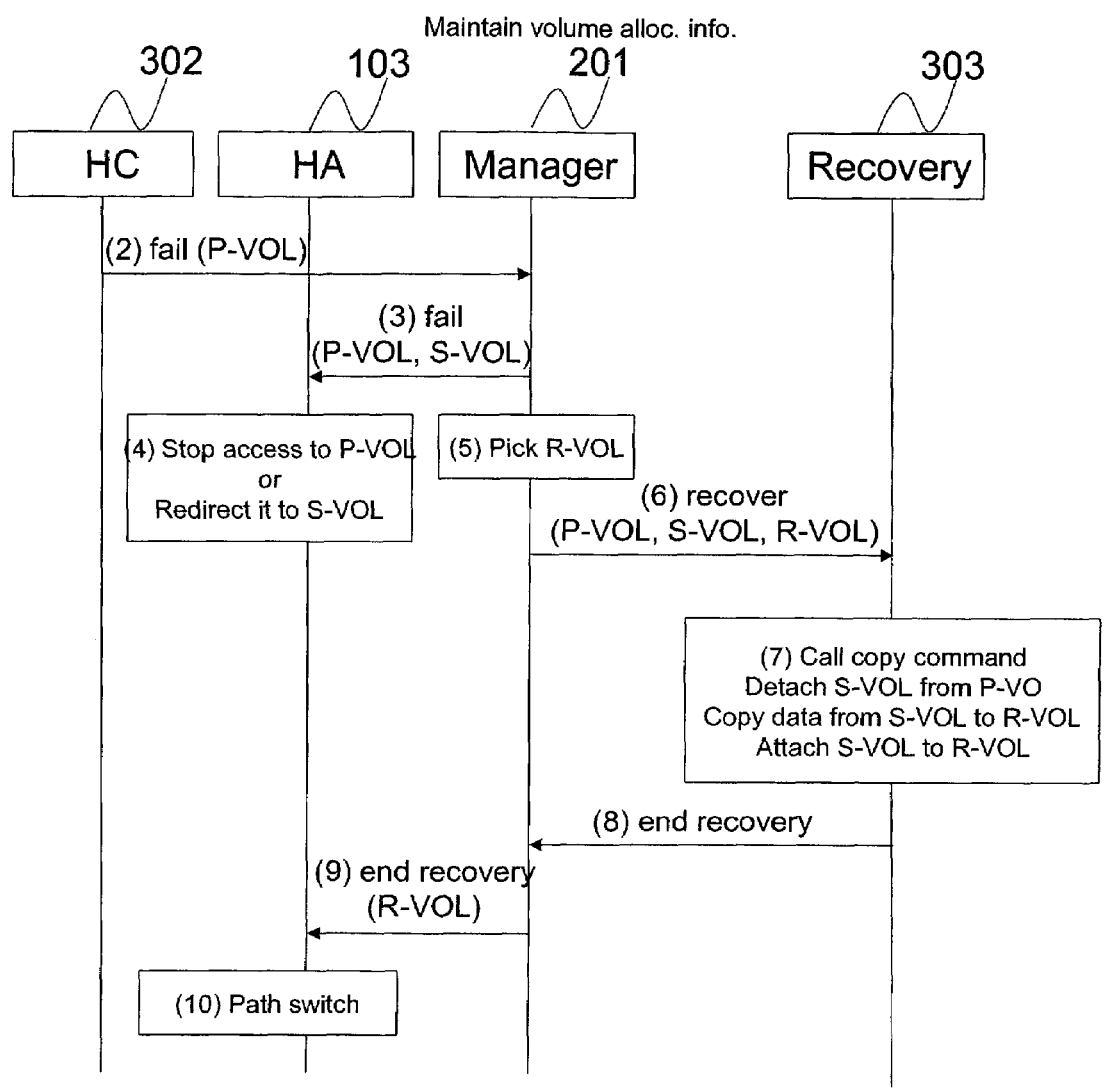
FIG. 12 is a sequence diagram of data recovery operation according to the example embodiment of FIG. 11.

FIG. 12 shows a sequence diagram of data recovery operation according to the example embodiment of FIG. 11. A health check module 302 detects a failure in the storage system and notifies a storage manager 201 of the failure (2). The storage manager 201 maintains volume allocation information in a volume management table 202. The volume management table 202 may include information regarding which volumes are primary volumes 304, secondary volumes 305 and recovery volumes 306. After receiving notification of a failure, the storage manager 201 may notify the HA 103 of the failure and pass information regarding the primary volume 304 and secondary volume 305 to the HA 103 (3). The HA 103 may stop accessing the primary volume 304 until a recovery process has completed, or may redirect the accesses to a secondary volume 305 during the recovery process (4). The storage manager 201 may then determine a recovery volume (5). A recovery volume may be chosen based on selection algorithms at the storage manager 201, or by other methods.

The storage manager 201 may send information regarding which volumes are primary volumes 304, secondary volumes 305 and recovery volumes 306 to a recovery module 303 at the storage system 300 (6). The recovery module 303 may call the existing copy/migration command in the disk controller 301, and then copy data from the remote volume 401 into the recovery volume 306 as part of the recovery process (7). Further, as part of the recovery process, the S-VOL 305 may be detached from the P-VOL 304, consequently detaching the remote volume 401 also from the P-VOL 304. The S-VOL 305 may then be attached to the R-VOL 306. The recovery module 303 may then notify the storage manager 201 (8) that then notifies the HA module 103 of completion of the recovery process (9), and the HA module 103 may then switch the access path to the recovery volume 306 (10). After finishing the recovery process, data may be replicated from the recovery volume 306 to the secondary volume 305.

Figure 13:
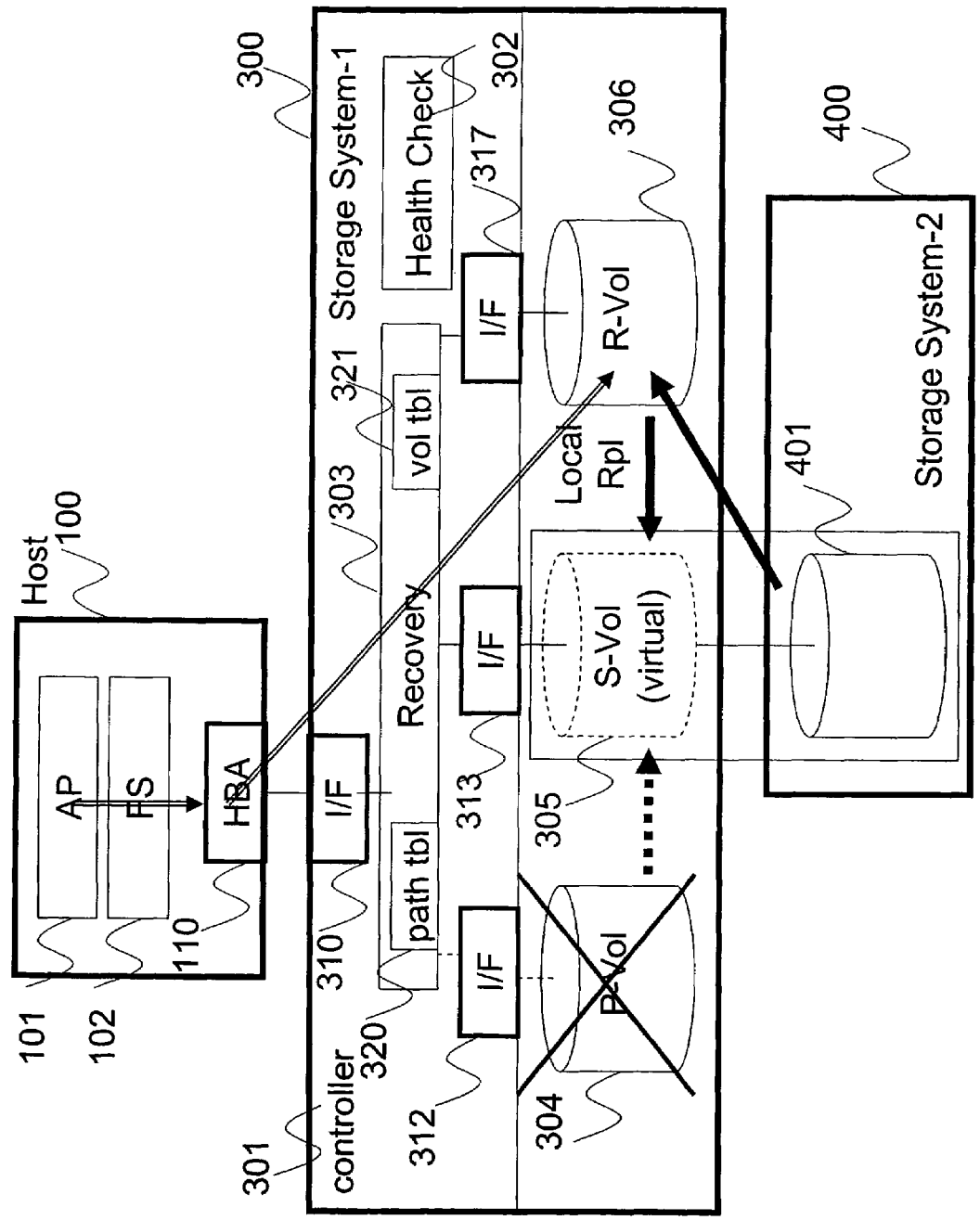
FIG. 13 is a diagram of a data recovery storage system without a HA module, according to an example embodiment of the present invention.

FIG. 13 shows a diagram of a data recovery storage system without a HA module, according to an example embodiment of the present invention. This embodiment includes a host device 100 without a HA module. A storage system 300 includes a controller 301 that has a recovery module 303 with both a path management table 320 and a volume management table 321. The contents of both tables are the same as the tables at the HA module in the previous embodiment. The recovery module 303 may take over the role of the HA module, which traps all I/O operations from an application system 101, or any other path switch module in a storage system can take over the role of the HA module. The recovery module 303 may be connected between an interface 310 to the host device 100 and one or more interfaces 312, 313, 317 to disk units at the storage system 300. In this embodiment of the present invention, the recovery module 303 controls the switching of paths and operations to an appropriate recovery volume after a failure is detected. The other recovery process is the same as the previous embodiment. Although the primary storage volume 304, secondary storage volume 305, and recovery storage volume 306 are shown as residing on different disk units with interfaces 312, 313 and 317 respectively, the present invention is not limited by this configuration as any combination of volumes and disk units may exist and still be within the scope of the present invention, for example, the secondary storage volume 305 and recovery storage volume 306 being on the same disk unit, the primary storage volume 304, secondary storage volume 305, and recovery storage volume 306 being on the same disk unit, etc. This applies to all possible embodiments of the present invention.

Figure 14:
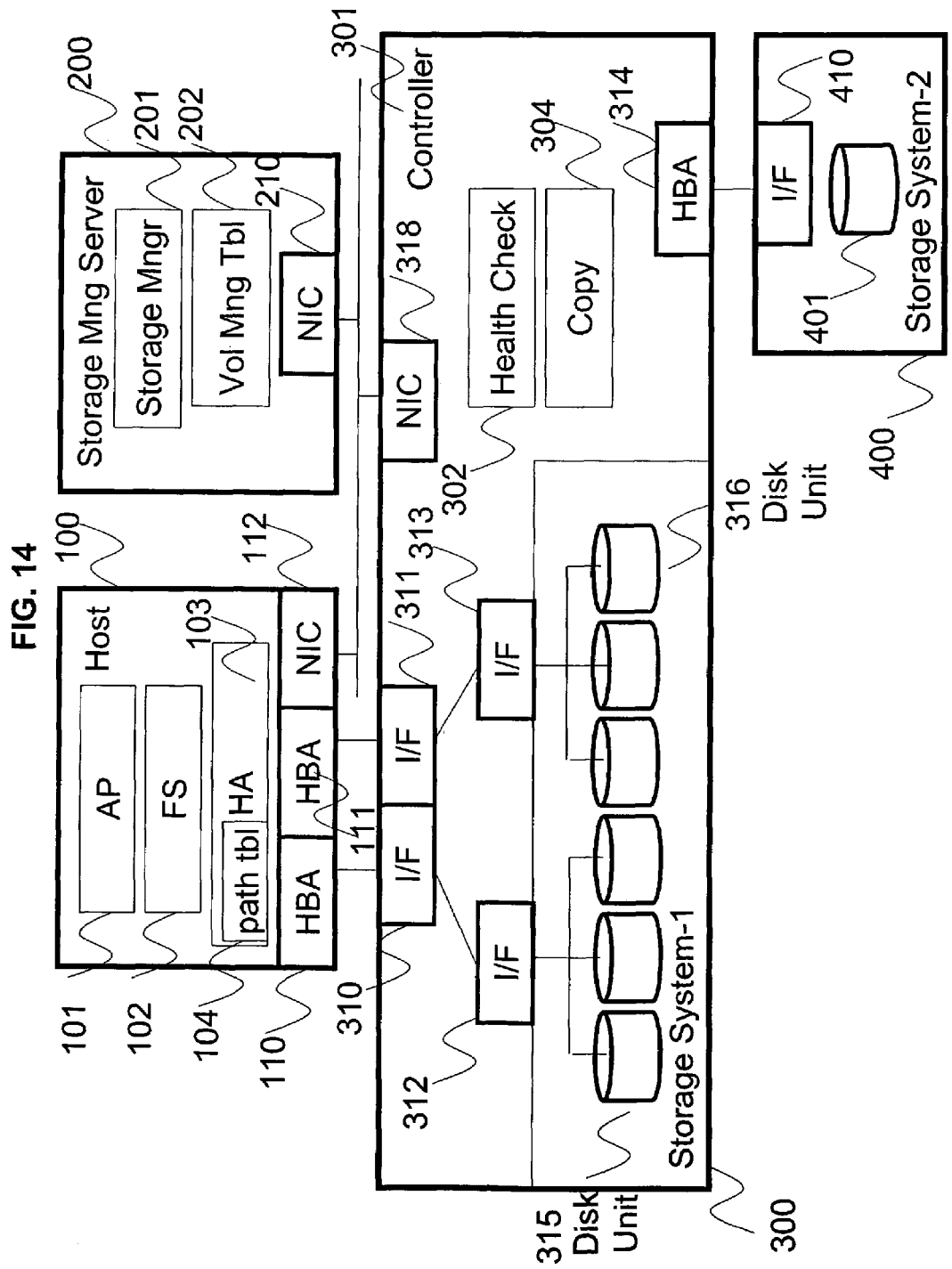
FIG. 14 is a diagram of a data recovery storage system using a copy function at the storage system, according to an example embodiment of the present invention.

FIG. 14 shows a diagram of a data recovery storage system using a copy function at the storage system, according to an example embodiment of the present invention. This system embodiment is similar to the example embodiment of FIG. 10, except a recovery module is not required. The recovery module in FIG. 10 invoked a copy operation in a storage system and notified of the end of operation. However, in this embodiment, there is an existing copy function of a controller 301 at the storage system 300. The copy operations in the storage system 300 are performed by the current copy function 304 of the storage system 300. Therefore, a storage manager 201 at a management server 200 may call the copy operation 304 directly. The copy function 304 replaces a recovery module, as illustrated in other embodiments of the present invention. The flow of recovery may be the same as in embodiments using a recovery module.

Figure 15:
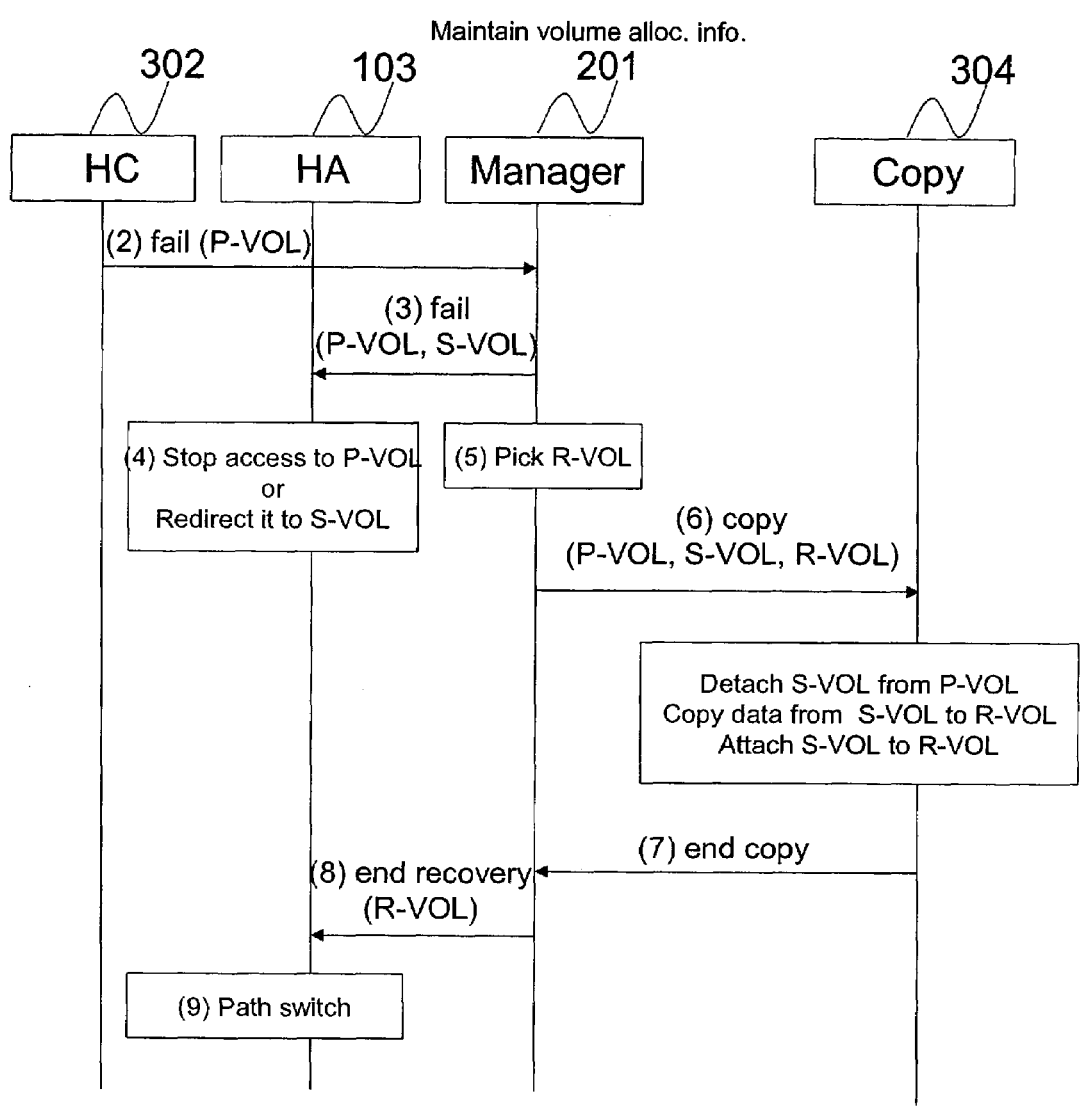
FIG. 15 is a sequence diagram of data recovery operation according to the example embodiment of FIG. 14.

FIG. 15 shows a sequence diagram of data recovery operation according to the example embodiment of FIG. 14. A health check module 302 detects a failure in the storage system and notifies a storage manager 201 of the failure (2). The storage manager 201 maintains volume allocation information in a volume management table 202. The volume management table 202 may include information regarding which volumes are primary volumes 304, secondary volumes 305 and recovery volumes 306. After receiving notification of a failure, the storage manager 201 may notify the HA 103 of the failure and pass information regarding the primary volume 304 and secondary volume 305 to the HA 103 (3). The HA 103 may stop accessing the primary volume 304 until a recovery process has completed, or may redirect the accesses to a secondary volume 305 during the recovery process (4). The storage manager 201 may then determine a recovery volume (5). A recovery volume may be chosen based on selection algorithms at the storage manager 201, or by other methods.

The storage manager 201 may call with information regarding which volumes are primary volumes, secondary volumes and recovery volumes directly to an existing copy/migration command 304 at the disk controller 301 (6). The copy command 304 may then copy data from the remote volume 401 into the recovery volume as part of the recovery process. Further, as part of the recovery process, the secondary storage volume may be detached from the primary storage volume, consequently detaching the remote volume 401 also from the primary storage volume. The secondary storage volume may then be attached to the recovery storage volume. The copy command 304 may then notify the storage manager 201 (7) that then notifies the HA module 103 of completion of the recovery process (8), and the HA module 103 may then switch the access path to the recovery volume (9). After finishing the recovery process, data may be replicated from the recovery volume to the secondary volume.

Figure 16:
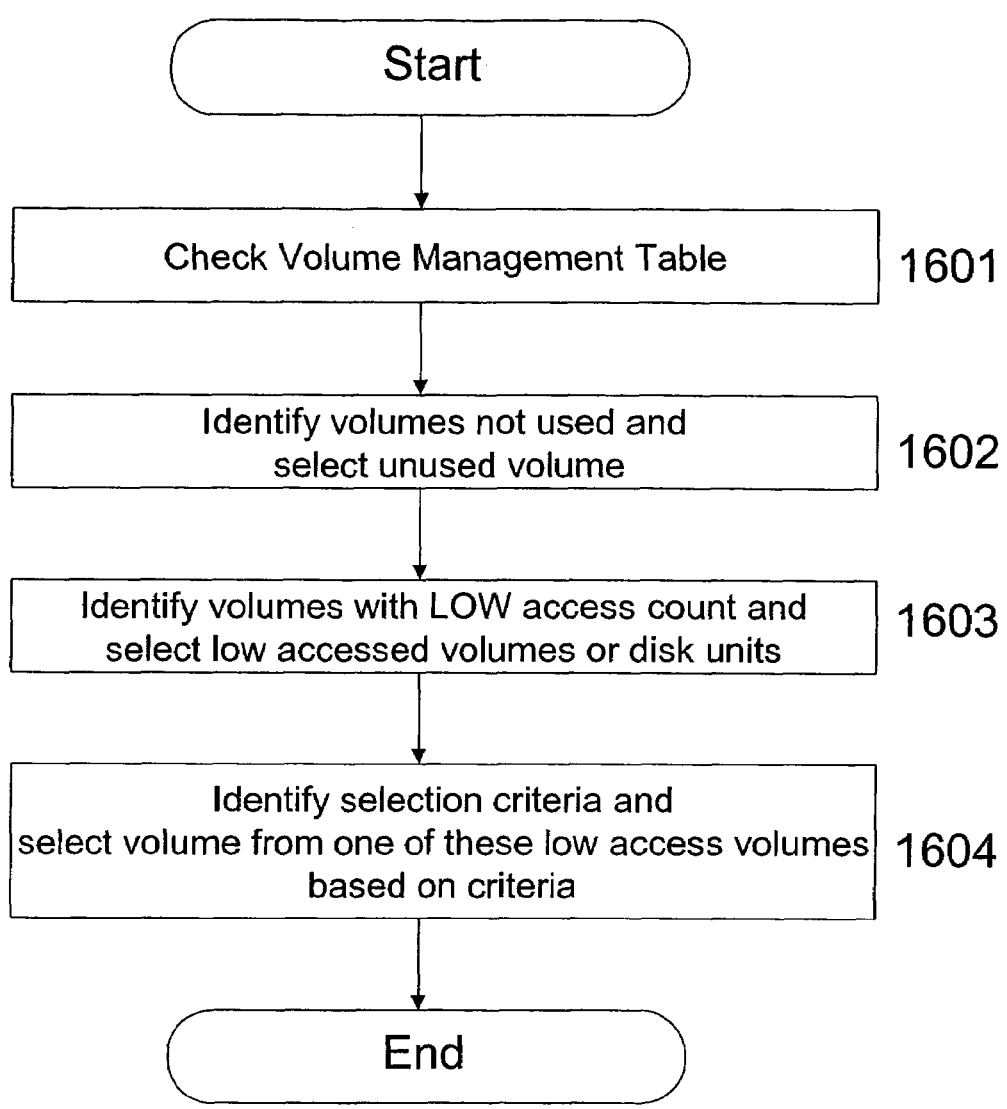
FIG. 16 is a flowchart of a recovery volume selection process according to an example embodiment of the present invention.

FIG. 16 shows a flowchart of a recovery volume selection process according to an example embodiment of the present invention. Many criteria, policies, procedures, routines, etc. may be used to determine the selection of a recovery volume, and the embodiments of the present invention are not limited to any, but may incorporate any process that selects a recovery volume. In this example process, initially a volume management table may be checked to get information regarding the volumes 1601. It may first be determined if any volumes are currently not being used and a selection made from them 1602. Further, it may be determined which volumes have a low access count 1603. Moreover, a recovery volume may be selected from one of these low access volumes in some way 1604 that may be pre-selected or determined dynamically based on current system conditions or some other criteria.

It is noted that the foregoing examples have been provided merely for the purpose of explanation and are in no way to be construed as limiting of the present invention. While the present invention has been described with reference to a preferred embodiment, it is understood that the words that have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A system for automatic recovery comprising:
a host device, the host device including an application generating input/output (I/O) operations; and
a first storage system operatively coupled to the host device, the first storage system including a failure detection module, a controller, a recovery module, a local primary storage volume receiving the I/O operations from the host device, and a local recovery volume, wherein data stored in the primary storage volume is replicated into a local virtual secondary storage volume using a local data replication mechanism, and wherein the data replicated to the virtual secondary storage volume is stored as replicated data to a physical secondary storage volume that is mapped to the local virtual secondary storage volume, said physical secondary storage volume being located at a second storage system separate from said first storage system;
wherein when the failure detection module detects a failure in the I/O operations between the host device and the primary storage volume, the recovery module initiates a recovery process that includes detaching the virtual secondary storage volume from receiving replication from the primary storage volume, selecting the local recovery storage volume, attaching the virtual secondary storage volume to the local recovery storage volume, and copying the replicated data from the virtual secondary storage volume to the local recovery storage volume,
wherein the recovery module is configured to provide a path from the host device to the local recovery storage volume to allow continuation of the I/O operations automatically following completion of the copying of the replicated data to the local recovery storage volume,
wherein the virtual secondary storage volume and the local recovery storage volume are configured with each other to resume local replication, whereby new write data written to the recovery volume by the host as a result of the I/O operations is replicated to the virtual secondary storage volume, and
wherein the I/O operations from the host are switched to the recovery storage volume after the recovery process has concluded.

2. The system according to claim 1, wherein the host includes a high availability module that includes a path management table containing information regarding paths between the host device and configured the first storage system.

3. The system according to claim 2, wherein the high availability module includes a volume management table containing information regarding volume name, a world wide node (WWN), logical unit number (LUN), whether the volume is used or un-used, whether each said storage volume is a primary storage volume, a virtual secondary storage volume, or a recovery storage volume, another volume that may be paired with this volume, a recovery volume used when this volume fails, and usage information of each said volumes at the first storage system.

4. The system according to claim 2, wherein the high availability module stops the I/O operations until the recovery process has concluded.

5. The system according to claim 2, wherein the high availability module continues the I/O operations to the virtual secondary storage volume after notification of the failure.

6. The system according to claim 1, wherein the second storage system is located remotely from a location of the first storage system.

7. The system according to claim 1, wherein the recovery storage volume is selected dynamically during the recovery process.

8. The system according to claim 1, wherein the failure able to be detected comprises:
a failure of a host bus adapter (HBA) on the host device,
failure of a link between the HBA and an interface on the first storage system,
failure of an interface on the first storage system,
failure of a link between an interface to the host device and an interface on the first storage system,
failure of a link between a first storage system interface and the primary storage volume, and
failure of the primary storage volume.

9. The system according to claim 1, further comprising, during the recovery process, wherein the recovery volume is selected by taking into account, at least in part, identified access counts of disk units making up available volumes from among which the recovery volume is selected.

10. The system according to claim 1, further comprising, during the recovery process, the recovery module is configured to copy the replicated data from the physical secondary storage volume into the recovery storage volume residing at the first storage system through the virtual secondary storage volume.

11. A system for automatic failure recovery comprising:
a host device, the host device including an application and a high availability module, the application generating input/output (I/O) operations;
a first storage system operatively coupled to the host device, the first storage system including a failure detection module, a controller, a recovery module, a primary storage volume receiving the I/O operations from the host device, and one or more other volumes eligible for use as a local recovery storage volume, wherein data stored in the primary storage volume is locally replicated into a virtual secondary storage volume as replicated data, wherein said replicated data is physically stored to an external storage volume located at a second storage system separate from said first storage system; and a server, the server operatively connected to the host device and the first storage system and including a storage manager and a volume management table that contains whether each said at least one storage volume is a primary storage volume, a secondary storage volume, or a recovery storage volume and disk utilization for all said volumes, wherein when the failure detection module detects a failure in the I/O operations between the host device and the primary storage volume, the failure detection module notifies the storage manager and the high availability module of the failure, the storage manager initiates a recovery process that includes selecting a local recovery storage volume from among said other volumes, restoring data to the local recovery storage volume by copying the replicated data from said virtual secondary storage volume following initiation of the recovery process, providing a path from the host device to the recovery storage volume to allow continuation of the I/O operations, and establishing replication between the local recovery storage volume and the virtual secondary volume so that the I/O operations to the local recovery storage volume are locally replicated to the virtual secondary volume.

12. The system according to claim 11, wherein the high availability module includes a volume management table containing information regarding volume name, a world wide node (WWN), logical unit number (LUN), whether the volume is used or un-used, whether each said at least one storage volume is a primary storage volume, a virtual secondary storage volume, or a recovery storage volume, another volume that may be paired with this volume, a recovery volume used when this volume fails, and usage information of said volumes at the first storage system.

13. The system according to claim 11, wherein the high availability module stops the I/O operations until the recovery process of copying the replicated data from the virtual secondary storage volume to the recovery storage volume has concluded.

14. The system according to claim 11, wherein, after notification of the failure, the high availability module directs the I/O operations to the virtual secondary storage volume and continues the I/O operations to the virtual secondary storage volume during the recovery process.

15. The system according to claim 14, wherein the high availability module switches the I/O operations to the recovery storage volume after the recovery process has concluded.

16. The system according to claim 11, wherein the high availability module includes a path management table containing information regarding paths between the host device and the first storage system.

17. The system according to claim 11, wherein the second storage system is located remotely from a location of the first storage system.

18. The system according to claim 11, wherein the recovery storage volume is selected dynamically by the storage manager on the server during the recovery process.

19. The system according to claim 11, wherein the failure able to be detected comprises:
a failure of a host bus adapter (HBA) on the host device,
failure of a link between the HBA and an interface on the first storage system,
failure of an interface on the first storage system,
failure of a link between an interface to the host device and an interface on the first storage system,
failure of a link between a first storage system interface and the primary storage volume, and
failure of the primary storage volume.

20. The system according to claim 18, further comprising, during the recovery process, wherein the recovery storage volume is selected by the storage manager on the server by taking into account, at least in part, identified access counts of disk units making up available said other volumes from among which the recovery volume is selected.

21. A system for automatic failure recovery comprising:
a host device, the host device including an application generating write data as a result of input/output (I/O) operations; and a storage system operatively coupled to the host device, the storage system including a failure detection module, a controller, a recovery module, a primary storage volume receiving the write data from the host device, and one or more other storage volumes able to be used as a local recovery storage volume, wherein write data stored in the primary storage volume is replicated into a local virtual secondary storage volume using a local replication mechanism, and wherein the write data replicated to the virtual secondary storage volume is stored as replicated data to a physical secondary volume at a second storage system separate from said first storage system, wherein when the failure detection module detects a failure in the I/O operations between the host device and the primary storage volume, the recovery module initiates a recovery process that includes detaching the virtual secondary storage volume from the primary storage volume, and identifying a path from the host device to a local recovery storage volume selected from said one or more other storage volumes to allow continuation of the I/O operations automatically, the recovery module being configured to attach the virtual secondary storage volume to the selected local recovery storage volume and copy the replicated data to the recovery storage volume during the recovery process, whereby following the recovery process, the local recovery storage volume receives the write data as the local primary storage volume, and wherein the write data thus received is replicated from the recovery storage volume to the virtual secondary storage volume using the local replication mechanism.

22. The system according to claim 21, wherein the primary storage volume resides on one or more first disk units and the local recovery storage volume resides on aone or more second disk units separate from the one or more first disk units.

23. The system according to claim 21, wherein the recovery volume is selected by taking into account, at least in part, identified access counts of disk units making up available said one or more other volumes from among which the recovery volume is selected.

24. The system according to claim 21, wherein the replicated data is copied to the local recovery storage volume from the physical secondary storage volume via the virtual secondary storage volume.

25. The system according to claim 21, wherein the primary storage volume and the recovery storage volume reside on the same disk unit.

26. A system for automatic failure recovery comprising:
a host device, the host device including an application, a file system, a high availability module, at least one host bus adapter, and a network interface card (NIC), the application generating input/output (I/O) operations;

a first storage system operatively coupled to the host device, the first storage system including a failure detection module, a recovery module, at least one interface to the host device, a controller, a NIC, a host bus adapter, a primary storage volume receiving the I/O operations from the host device, one or more other storage volumes for use as local recovery storage volumes, wherein data stored in the primary storage volume is replicated into a virtual secondary storage volume using a local replication mechanism;

a server, the server operatively connected to the host device and the first storage system via a NIC and including a storage manager and a volume management table; and a second storage system operatively coupled to the first storage system and via an interface on the second storage system and the host bus adapter on the first storage system, and including at least one remote storage volume that stores replicated data replicated from said primary storage volume to said virtual secondary storage volume, wherein when the failure detection module detects a failure in the I/O operations between the host device and the primary storage volume, the failure detection module notifies the storage manager of the failure, wherein the storage manager notifies the high availability module of the failure and initiates a recovery process that includes selecting a local recovery storage volume from among the one or more other storage volumes, attaching the virtual secondary storage volume to the selected local recovery storage volume, copying the replicated data from the virtual secondary storage volume to the recovery storage volume, and providing a path from the host device to the recovery storage volume to allow continuation of the I/O operations automatically, whereby following completion of the recovery process the local recovery storage volume receives the I/O operations as the local primary storage volume, and wherein write data received as a result of the I/O operations is replicated from the recovery storage volume to the virtual secondary storage volume using the local replication mechanism.

27. A system for automatic failure recovery comprising:
a host device, the host device including an application, a file system, a high availability module, at least one host bus adapter, and a network interface card (NIC), the application generating input/output (I/O) operations;

a first storage system operatively coupled to the host device, the first storage system including a failure detection module, at least one interface to the host device, a controller, a NIC, a host bus adapter, and multiple storage volumes residing on different disk units, a primary storage volume of the multiple storage volumes receiving the I/O operations from the host device and processing the I/O operations, data stored in the primary storage volume being replicated into a virtual secondary storage volume using a local replication mechanism;

a server, the server operatively connected to the host device and the first storage system via a NIC and including a storage manager and a volume management table; and a second storage system operatively connected to the first storage system and via an interface on the second storage system and the host bus adapter on the first storage system, and including at least one remote storage volume that stores data replicated from said primary storage volume to said virtual secondary storage volume, wherein when the failure detection module detects a failure in the I/O operations between the host device and the primary storage volume, the failure detection module notifies the storage manager of the failure, the storage manager initiates a recovery process that includes selecting a local recovery storage volume from the multiple storage volumes, notifying the high availability module of the failure, initiating copying of data to the recovery storage volume from the virtual secondary storage volume, and providing a path from the host device to the recovery storage volume to allow continuation of the I/O operations automatically following the recovery process, wherein the I/O operations are directed to the virtual secondary storage volume during the recovery process, and whereby following the recovery process, the recovery storage volume receives the I/O operations as the local primary storage volume, and wherein the data received as a result of the I/O operations is replicated from the recovery storage volume to the virtual secondary storage volume using the local replication mechanism.

28. A method for automatic failure recovery in a storage system comprising:
performing local replication by replicating data stored in a primary storage volume at a first storage system into a virtual secondary storage volume as replicated data, the primary storage volume storing write data resulting from Input/Output (I/O) operations between the storage system and a host device;

detecting a failure in the I/O operations with the primary storage volume;

initiating a recovery process following the failure that includes:

detaching the virtual secondary storage volume from the primary storage volume;

identifying a path from the host device to the primary volume and switching the path to the virtual secondary storage volume to allow continuation of the I/O operations;

attaching said virtual secondary volume to a selected local recovery volume and copying the replicated data from the virtual secondary storage volume to a the local recovery volume in the first storage system;

redirecting I/O operations automatically to said local recovery volume from said virtual secondary storage volume following completion of copying the replicated data from said virtual secondary storage volume to said local recovery volume; and resuming local replication by replicating the write data subsequently stored in said recovery volume following completion of the recovery process to said virtual secondary storage volume.

29. The method according to claim 28, wherein said virtual secondary storage volume is mapped to a remote storage volume located in a remote second storage system, wherein said step of switching the path of the host from the primary volume to the virtual secondary storage volume comprises switching the path to the virtual secondary storage volume in the first storage system and passing the I/O operations to said remote storage volume in the second storage system.

30. The method according to claim 28, further including, selecting the local recovery volume by taking into account, at least in part, identified access counts of disk units making up available volumes from among which the recovery volume is selected.

31. The method according to claim 29, further including, during the recovery process, copying the replicated data to the recovery storage volume by copying the replicated data that was replicated into the remote storage volume into the recovery storage volume through the virtual storage volume.

32. The method according to claim 28, wherein identifying the path is performed at the host device using a path management table.

33. The method according to claim 28, wherein the failure able to be detected includes:

failure of a host bus adapter (HBA) on the host device,
 failure of a link between the HBA and an interface on the first storage system,
 failure of an interface on the first storage system,
 failure of a link between an interface to the host device and an interface on the first storage system,
 failure of a link between a first storage system interface and the primary storage volume, and
 failure of the primary storage volume.

34. The method according to claim 28, wherein the recovery storage volume is pre-determined before the recovery process begins.

35. The method according to claim 28, wherein the recovery storage volume is selected dynamically during the recovery process.

* * * * *